June 2, 1936. F. L. CHADWICK 2,042,587
COMBINED AUTOMOBILE PANEL AND ARM REST ASSEMBLY
Filed June 30, 1932
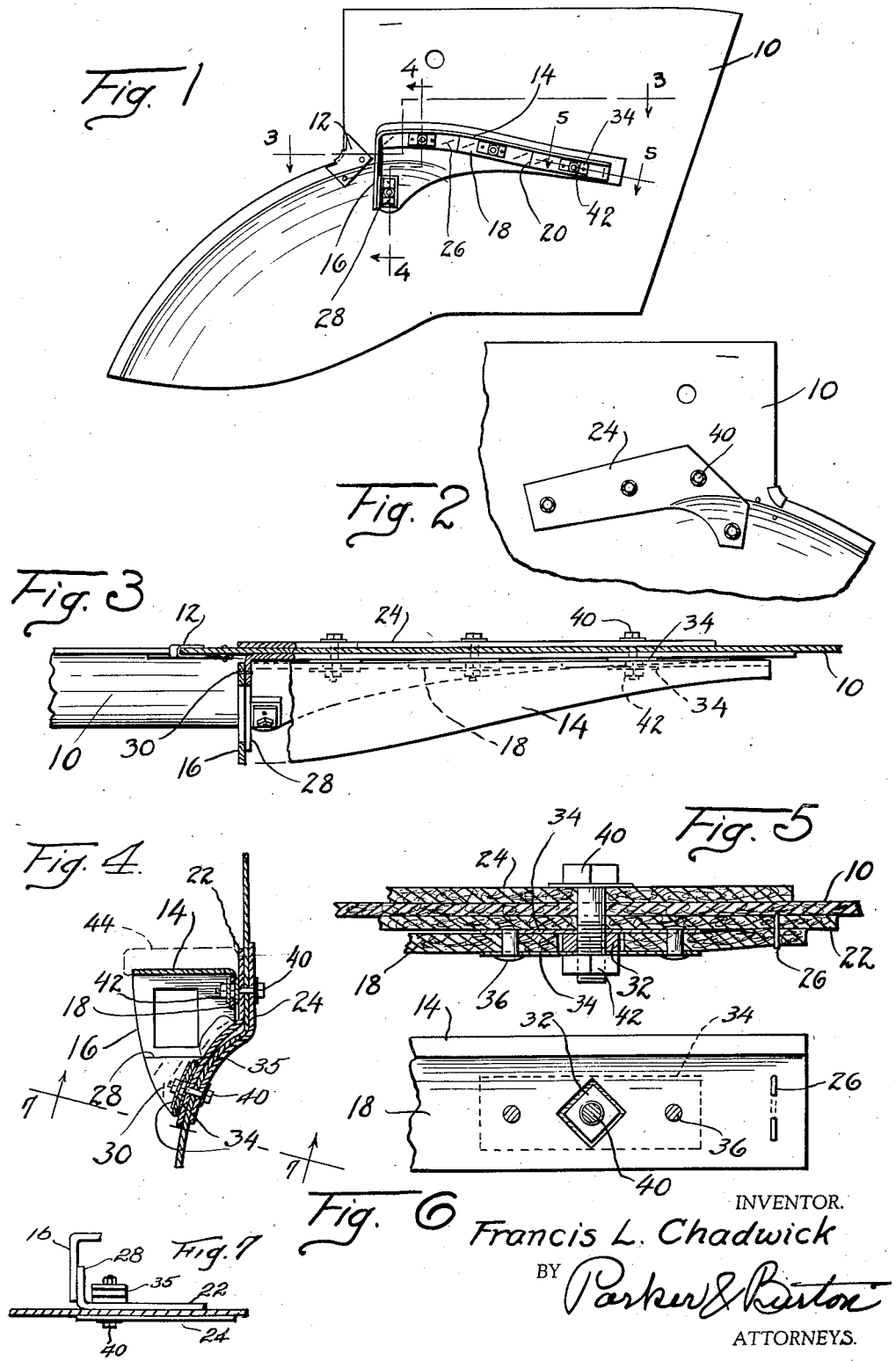
INVENTOR.
Francis L. Chadwick
BY Parker & Burton
ATTORNEYS.

Patented June 2, 1936

2,042,587

UNITED STATES PATENT OFFICE 2,042,587

COMBINED AUTOMOBILE PANEL AND ARM REST ASSEMBLY

Francis L. Chadwick, Detroit, Mich., assignor to Woodall Industries Incorporated, Detroit, Mich., a corporation of Michigan Application June 30, 1932, Serial No. 620,194

5 Claims. (Cl. 155—198)

My invention relates to improvements in laminated fiber board panel structures and their fabrication.

An object is to provide an interior trim panel for an automobile body formed of thermoplastic fibrous material and provided with an arm rest assembly formed of thermoplastic fibrous material carried thereby. The entire assembly is of light weight, durable construction and inexpensive to manufacture.

A further object is to provide an arm rest portion in such an assembly which is capable of being readily assembled and secured in the assembly and which snugly engages the panel and is securely fastened thereto against looseness or rattle. A meritorious feature is the provision of such an arm rest structure formed of thermoplastic material which is so arranged and shaped that it conforms to the curvature of the panel that supports it and yields under pressure of the fastening means, as does the panel iteself, so that a close fitting engagement of the parts is obtained. Another meritorious feature is the provision of such a construction wherein an improved nut cage structure is provided within the material of which the arm rest is built.

Other advantageous and meritorious features will more fully appear from the following description, appended claims and accompanying drawing, wherein,—

Fig. 1 is a side elevation of my improved panel structure,

Fig. 2 is an elevation of a fragment of the panel structure taken from the opposite side of that of Fig. 1, Fig. 3 is a cross-sectional view taken on the line 3—3 of Fig. 1, Fig. 4 is a cross-sectional view taken on the line 4—4 of Fig. 1, Fig. 5 is a cross-sectional view taken on the line 5—5 of Fig. 1, Fig. 6 is a side elevation of that part of the arm rest which is shown in cross section in Fig. 5 taken along a line between the outer retaining plate and the adjacent flange.

Fig. 7 is a cross-sectional view taken on the line 7—7 in Fig. 4.

In the embodiment of my invention shown in the drawing I illustrate a rear quarter panel 10. This has an upper flat portion and a lower curved portion. 12 is a reinforcement at a corner. The arm rest assembly is secured to this panel adjacent the line of juncture of the upper flat portion and the lower curved portion. This arm rest assembly comprises an arm rest portion indicated as 14 and may be curved as indicated in the drawing. This is turned downwardly at one end as at 16 and along one edge forming a flange 18. This flange is divided into a plurality of sections by lines of severance 20. There is provided a back reinforcing member 22 shaped to seat against the panel and to extend over the curved portion thereof as shown in Fig. 4. There is also provided an outer reenforcing member 24 shaped to conform to the shaped panel as shown in Fig. 4. The back member 22 is secured to the flange 18 of the arm rest portion by wire stitching 26 or the like. This back member 22 is turned inwardly at one end as at 28 adjacent the end 16 of the arm rest portion and secured thereto by a stitching 30.

The flange 18 of the arm rest portion is provided with a nut receiving aperture in each section. A nut 32 is seated in each aperture. The aperture is oversize the nut so as to permit limited movement or play of the nut within the aperture, but the aperture is so shaped as to prevent rotation of the nut therein. A pair of apertured plates 34 are arranged on opposite sides of the flange at each nut receiving aperture and secured in place by rivets 36 to hold the nut 32 in the aperture. This forms a nut cage in the material itself wherein the nut has a limited play as described. The nut cage structure minimizes the use of space by the nut and bolt combination and more importantly provides an arrangement for locking the nut 32 in place with a slight freedom of movement.

The division of the flange 18 into a plurality of sections facilitates the shaping of the arm rest portion proper to the desired curvature. When shaped to this curvature the sections are jammed together so that the flange forms a substantially rigid member.

The arm rest assembly including the panel construction, the arm rest and the reenforcing members are all preferably composed of thermoplastic fibrous material. This material may be in the form of panel board structure such as that described in the Patent to Woodall, No. 1,999,383. Such fiber boards comprise cellulose fibers held together by suitable thermoplastic binders. A binder satisfactory for this purpose is an asphaltum compound. This type of material or board is deformable under the effect of heat and pressure to assume and permanently retain a deformed shape.

Bolts 40 are provided which are provided in suitable number to secure the arm rest assembly to the panel. These bolts extend through the reenforcing plate 24, the panel 10, the back member 22 and the flange 18 of the arm rest 14. The bolts engage the nuts 32 and each bolt is itself provided with a retaining or check nut 42. Tightening of the nuts 42 on the bolts draws the several laminations of the structure together. The deformable character of the thermoplastic sheets which comprise the entire construction lends itself to producing a particularly tight and unitary construction in that the panel and the arm rest assembly each yield to shape itself to meet the contour of the other under the pressure exerted upon tightening of the nuts 42 on the bolts 40. The permitted play of the nuts 32 within the oversize apertures in the flange 18 enables adjustment of these nuts to meet any misalignment of the parts.

A similar nut and bolt fastening construction is provided for securing the lower sections of the reinforcing members 22 and 24 to the panel 10. This construction comprises a small piece of thermoplastic fibrous material 35 (see Figs. 4 and 7) on both sides of which are secured plates 34 similarly as in the previously described features. The member 35 is apertured to receive a nut and a part of a bolt 40 extending therethrough. The nut may be adjusted as described above.

The entire assembly is particularly light and strong yet inexpensive to manufacture. The back member 22 extends up beyond the arm rest portion 14 so that the cushion member indicated in dotted line as 44 in Fig. 4 is positioned thereby.

I claim:

1. A panel structure comprising a rear quarter panel formed of deformable thermoplastic material, an arm rest assembly formed of deformable thermoplastic material and having a longitudinally curved arm rest portion provided with a deformable flange, a back member adapted to engage said flange and one side of said rear quarter panel, a reenforcing member adapted to engage the opposite side of said rear quarter panel and fastening means extending through said reenforcing member, said panel, said back member and flange of the arm rest portion securing said several portions together, each of which is yieldable under pressure of said fastening means.

2. An arm rest having an arm supporting member composed of deformable fibrous material and provided with a downwardly turned portion extending along one longitudinal edge of the member and at one end thereof, a reinforcing strip of fibrous material extending along said longitudinally downwardly turned portion and being bent to extend along said downwardly turned portion at said end of the arm rest, and securing means extending between said strip and bent portion thereof and said downwardly turned edge and end portions whereby the arm rest is stiffened into permanent formation.

3. A laminated assembly of deformable fibrous material comprising, in combination, a panel of deformable fibrous thermoplastic material, an arm rest of deformable fibrous thermoplastic material having a depending flange, a reinforcing strip of deformable fibrous thermoplastic material extending along side of said panel, and fastening means extending through said flange, reinforcing member and panel and drawing the same yieldingly together to form a tight fitting juncture under pressure of the fastener means.

4. A laminated assembly of deformable fibrous material comprising, in combination, a panel of deformable fibrous thermoplastic material, an arm rest of deformable fibrous thermoplastic material having a depending flange, reinforcing strips of deformable fibrous thermoplastic material extending along both sides of said panel, and fastening means extending through said flange, reinforcing strips and the panel and drawing the same yieldingly together under pressure of the fastening means to secure the arm rest to the panel.

5. An arm rest assembly comprising, in combination, a vertical panel composed of yielding thermoplastic fibrous material, an arm rest likewise composed of yielding thermoplastic fibrous material, a strip of yielding thermoplastic fibrous material for reenforcing the assembly, and fastening means attaching said arm rest to the central expanse of said panel and passing through said panel, said arm rest and said reenforcing strip yieldingly drawing the same into tight fitting engagement whereby the panel forms the sole support of the arm rest.

FRANCIS L. CHADWICK.